US009261143B2

(12) United States Patent
Mola et al.

(10) Patent No.: US 9,261,143 B2
(45) Date of Patent: Feb. 16, 2016

(54) TUBULAR BUSHING CO-MOLDABLE WITH TUBS OF WASHING MACHINES

(71) Applicants: Roberto Mola, Turin (IT); Riccardo Restivo, Turin (IT); Gianpiero Scaltriti, Turin (IT)

(72) Inventors: Roberto Mola, Turin (IT); Riccardo Restivo, Turin (IT); Gianpiero Scaltriti, Turin (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/485,832

(22) Filed: Sep. 15, 2014

(65) Prior Publication Data

US 2015/0078697 A1     Mar. 19, 2015

(30) Foreign Application Priority Data

Sep. 13, 2013    (IT) ............................... TO2013A0743

(51) Int. Cl.
| | |
|---|---|
| *F16C 41/00* | (2006.01) |
| *D06F 37/00* | (2006.01) |
| *D06F 37/26* | (2006.01) |
| *F16C 35/067* | (2006.01) |
| *F16C 35/06* | (2006.01) |

(52) U.S. Cl.
CPC .............. *F16C 41/002* (2013.01); *D06F 37/00* (2013.01); *D06F 37/262* (2013.01); *D06F 37/269* (2013.01); *F16C 35/061* (2013.01); *F16C 35/067* (2013.01)

(58) Field of Classification Search
CPC ............................. F16C 41/002; D06F 37/269
See application file for complete search history.

(56) References Cited

U.S. PATENT DOCUMENTS

| | | | | |
|---|---|---|---|---|
| 3,564,477 | A * | 2/1971 | Pompei ............... | F16C 33/7843 439/17 |
| 4,515,417 | A * | 5/1985 | Shiraishi .................. | F16C 19/52 384/445 |
| 2007/0137260 | A1* | 6/2007 | Shikamori et al. ...... | D06F 17/06 68/3 R |
| 2011/0135239 | A1* | 6/2011 | Eo .......................... | B22D 17/24 384/584 |

FOREIGN PATENT DOCUMENTS

JP        8-299672 A   * 11/1996

* cited by examiner

*Primary Examiner* — Thomas R. Hannon
(74) *Attorney, Agent, or Firm* — Bryan Peckjian; SKF USA Inc. Patent Dept.

(57) ABSTRACT

A tubular bushing co-moldable with tubs of washing machines is provided. The tubular bushing is suitable to be engaged by a drive shaft of the washing machine extending along a central axis (A) and being provided with two rolling bearings (20), arranged at a given distance from each other along the axis (A) to allow rotation of the drive shaft with respect to the tub, and a containing sleeve, made of plastic and by means of co-molding around the two bearings; a current dispersion means being incorporated in the containing sleeve and suitable to be electrically connected both to the drive shaft and to earth so as to prevent an accumulation of static electricity in the washing machine and prevent electrostatic discharges.

9 Claims, 1 Drawing Sheet

TUBULAR BUSHING CO-MOLDABLE WITH TUBS OF WASHING MACHINES

CROSS-REFERENCE TO RELATED APPLICATIONS

This application claims priority to Italian Patent Application No. TO2013A000743 filed Sep. 13, 2014, the contents of which are herein fully incorporated by reference.

FIELD OF THE INVENTION

The present invention is related to a tubular bushing co-moldable with tubs of washing machines.

BACKGROUND OF THE INVENTION

Known tubular bushings, co-moldable with tubs of washing machines, are suitable to be engaged by a drive shaft of the washing machine, in order to support, by means of the drive shaft, the rotatable drum inside the tub. Known tubular bushings comprise two rolling bearings, to allow a rotation of the drive shaft, and a containing sleeve, which is made of plastic and by means of co-molding around the two bearings.

Such known tubular bushings are suitable to be co-molded with the tubs of the washing machines, to simplify the production process of said washing machines. In particular, the bushing containing sleeve is co-molded together with tubs of washing machines, so as to realize one piece with the said tubs, allowing remarkable savings in process time, handling time and components number.

Before this simplification, tubular bushings were made of metal materials, so as drums and tubs of washing machines, and any accumulation of static electricity, due to drum rotation or to fabrics friction inside the drum, was almost prevented. The arrival of new co-molded tubular bushings, having the majority of their components made of plastic material and being electrically insulated, if on one hand has simplified a lot the production of current washing machines, on the other hand has caused the insurgence of electrostatic problems for the same washing machines.

SUMMARY OF THE INVENTION

Aim of the present invention is to realize a tubular bushing co-moldable with tubs of washing machines, the tubular bushing does not showing the above mentioned inconveniences.

According to the present invention, a tubular bushing co-moldable with tubs of washing machines is realized, the tubular bushing having the characteristics as in the enclosed independent claim.

Further embodiments of the invention, preferred and/or particularly advantageous, are described according to the characteristics as in the enclosed dependent claims

BRIEF DESCRIPTION OF THE DRAWINGS

A preferred embodiment of the invention will be now described, in an exemplifying and not limitative way, by reference to the enclosed drawing, in which.

DETAILED DESCRIPTION OF THE INVENTION

Figure 3:
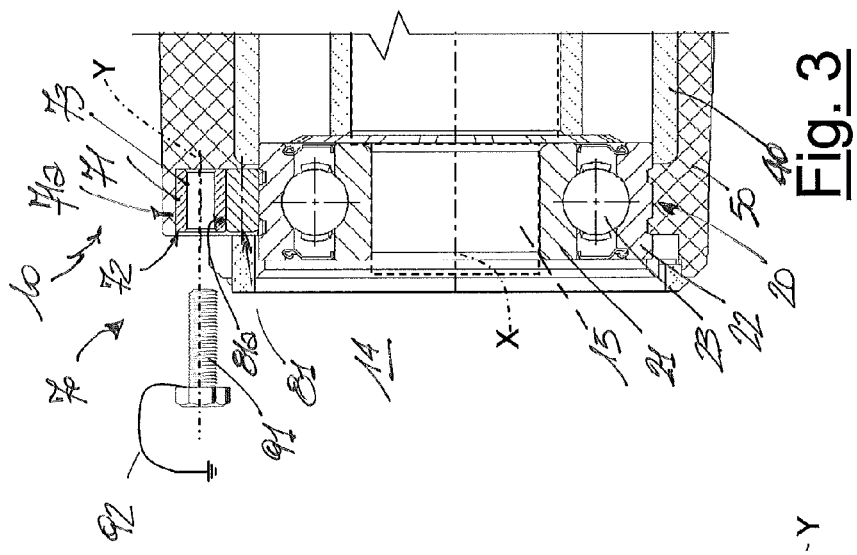
FIG. 3 shows, in an enlarged scale, a longitudinal section, with some parts taken away for clarity, of the tubular bushing of FIG. 1.
Figure 1:
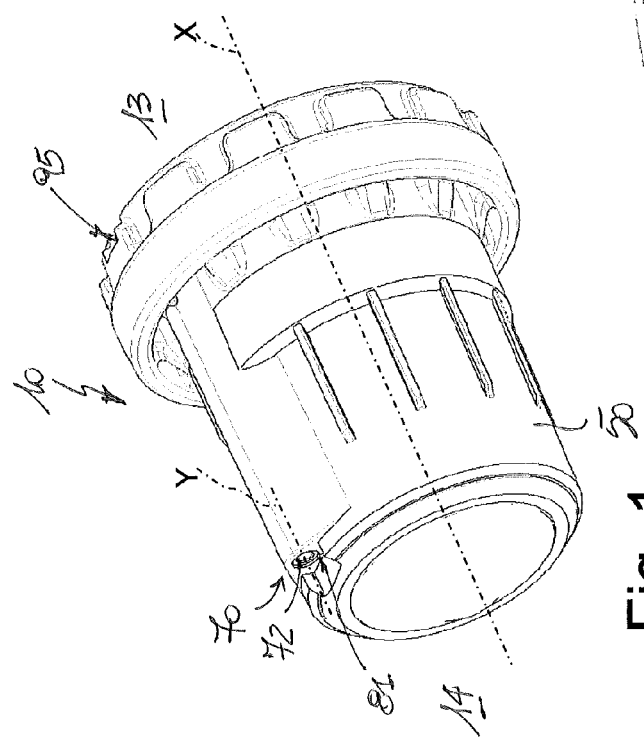
FIG. 1 is a perspective view of a preferred embodiment of the tubular bushing according to the present invention.

With reference to FIGS. 1 and 3, in such drawings is shown as a whole a tubular bushing 10 co-moldable with a tub of a washing machine (known and not shown), to support, in a rotatable way around a central axis X of rotation, a drive shaft 15 of a drum (known and not shown) of said washing machine. The tubular bushing 10 extends along the axis X between a side 13, so called "humid", being close to the mentioned tub and a side 14, so called "dry", being close to the washing machine outside, and comprises:

two rolling bearings 20 (only one of them is shown) located along the axis X and engaged by the drive shaft 15 to allow the rotation of the drive shaft 15 with respect to the mentioned tub; and a spacer 40 axially interposed between the two bearings 20.

The bearing 20, of the two rolling bearings 20, which is shown in FIG. 3, is the one located along the tubular bushing 10, on the dry side 14. The bearing 20 comprises a rotatable inner ring 21, engaged by the drive shaft 15, a stationary outer ring 22 and a plurality of rolling bodies 23, interposed between the rings 21 and 22. Both the rings 21 and 22, the rolling bodies 23 and the drive shaft 15 are made of metal material, anyhow of electrically conductive material. Moreover, the tubular bushing 10 comprises a containing sleeve 50, which is made of plastic material and is co-molded around the two bearings 20 and the spacer 40. The spacer 40 has the function to define a structural stiff element of the tubular bushing 10 and to retain the two bearings 20 at a determined axial distance from each other, during the co-molding process.

Finally, the tubular bushing 10 comprises dispersion means 70, for example, a current dispersion device 70, which is incorporated in the containing sleeve 50 and is electrically connected both to the drive shaft 15 and to earth, to prevent an accumulation of static electricity in the washing machine and prevent electrostatic discharges.

Figure 2:
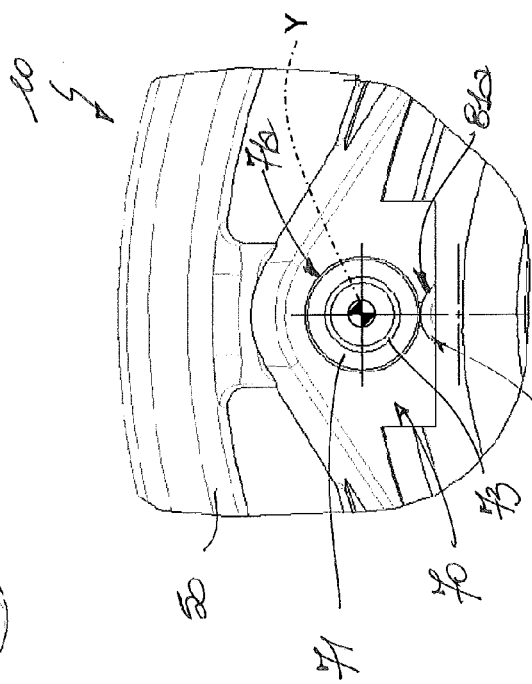
FIG. 2 is a front view, in an enlarged scale and with some parts taken away for clarity, of the tubular bushing of FIG. 1.

According to what is also shown in FIG. 2, dispersion means 70 comprise a socket 71, which is defined as a hollow cylindrical body 71, made of electrically conductive material and partially embedded in the containing sleeve 50, and an intermediate transfer body 81, which is also made of electrically conductive material. The body 81 is almost completely embedded in the containing sleeve 50 and is located close to both the body 71 and the bearing 20, on the dry side 14. The bodies 71 and 81 are located along the outer edge of the containing sleeve 50 and axially aligned to the bearing 20, and present correspondent outer surfaces 71a and 81a arranged so as to make contact each other. The body 71 is located radially outwards the body 81, which is located in an intermediate position between the body 71 and the bearing 20, and whose surface 81a is arranged so as to be also in direct contact with the outer ring 22 of the bearing 20.

The body 71 presents a central axis Y, parallel to the axis X, and is axially confined by an axial face 72, which is transversal to the axis Y, and is completely exposed outside the containing sleeve 50, on the dry side 14. Preferably, the body 71 is provided with an inner thread 73, while the body 81 is defined by a roll, which is a normally available element for rolling bearing producers.

Moreover, dispersion means 70 comprises a pin 91, made of electrically conductive material and releasable engaged inside the body 71, and an earth electrical connection 92, electrically connected to the pin. The pin 91, which is shown in FIG. 3 in its disengaged position, can be a plug or, if the body 71 were provided with the thread 73, as in the preferred embodiment of the present invention, is an earthing screw and is screwed in an unscrewable manner inside the said body 71.

While the tubular bushing 10 is mainly made of plastic material, so as to prevent any electrical connection between the drum of the washing machine and the external environment, thus electrically insulating the drum of the washing machine from the remaining parts of said washing machine, dispersion means 70, as above disclosed, comprise elements—the body 71, the body 81, the pin 91, the electrical connection 92—all electrically conductive. Such elements are arranged so as to make contact each other and realize an electrical circuit, which starts from the drive shaft 15, goes through the bearing 20, and ends at earth, through the connection 92. Therefore, since the drive shaft 15 is connected to the drum of the washing machine, to let the drum rotating, dispersion means 70 allow to discharge at earth any accumulation of static electricity in the washing machine, thus preventing possible electrostatic discharges.

To allow a correct co-molding of the tubular bushing 10 with the tub of the washing machine, in other words, to allow the axis Y of dispersion means 70 being located in a suitable position for connecting the device towards the outside of the washing machine and towards earth, by means of the pin 91 and the electrical connection 92, the tubular bushing 10 also comprises references means 95, out of the containing sleeve 50, axially on the opposite side with respect to dispersion means 70, in other words, on the humid side 13 of the containing sleeve 50, and is axially aligned with the device 70.

Since the tubular bushing 10 has a substantially cylindrical outer shape, such reference means 95 make easier the handling of said tubular bushing 10 during the co-molding process with tubs of washing machines, simplifying said process and always ensuring the same positioning of dispersion means 70.

Other than the embodiments of the invention, as above disclosed, it is to be understood that a vast number of variations exist. It should also be appreciated that the exemplary embodiment or exemplary embodiments are only examples and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

The invention claimed is:

1. A tubular bushing co-moldable with tubs of washing machines, the tubular bushing suitable to be engaged by a drive shaft of the washing machine extending along a central axis (A) and comprising:
   two rolling bearings arranged at a given distance from each other along the axis (A) to allow rotation of the drive shaft with respect to the tub;
   a containing sleeve made of plastic and by means of co-molding around the two bearings; wherein
   the tubular bushing provides current dispersion means incorporated in the containing sleeve and is suitable to be electrically connected both to the drive shaft and to earth to prevent an accumulation of static electricity in the washing machine and prevent electrostatic discharges.

2. The tubular bushing according to claim 1, wherein the current dispersion means provides a socket made of electrically conductive material and partially embedded in the containing sleeve and a pin suitable to be connected to earth and releasable engaged inside the socket.

3. The tubular bushing according to claim 2, wherein the current dispersion means includes an intermediate transfer body made of electrically conductive material and arranged to make contact both with the socket and with a first bearing of the two bearings.

4. The tubular bushing according to claim 3, wherein the intermediate transfer body is arranged in contact with an outer ring of the first bearing.

5. The tubular bushing according to claim 4, wherein the socket is defined by a hollow cylindrical body having an axial face facing the outside of the containing sleeve.

6. The tubular bushing according to claim 5, wherein the hollow cylindrical body is internally threaded.

7. The tubular bushing according to claim 6, wherein the pin is defined by an earthing screw and is inserted in an unscrewable manner inside the socket.

8. The tubular bushing according to claim 1, further comprising reference means axially aligned with the current dispersion means and arranged outside the containing sleeve on the opposite side to the current dispersion means.

9. The tubular bushing according to claim 1, further comprising a spacer arranged between the two bearings to retain the two bearings at an axial distance from each other during co-moulding of the spacer and the two bearings with the containing sleeve.

* * * * *